United States Patent [19]
Steimer

[11] Patent Number: 6,009,002
[45] Date of Patent: Dec. 28, 1999

[54] OPERATING A POWER ELECTRONIC CIRCUIT ARRANGEMENT HAVING MULTIPLE POWER CONVERTERS

[75] Inventor: Peter Steimer, Schleinikon, Switzerland

[73] Assignee: Asea Brown Boveri AG, Baden, Switzerland

[21] Appl. No.: 09/071,038

[22] Filed: May 4, 1998

[30] Foreign Application Priority Data

May 17, 1997 [DE] Germany .......................... 197 20 787

[51] Int. Cl.⁶ .................................................. H02M 5/44
[52] U.S. Cl. .............................. 363/34; 363/37; 363/40; 363/65
[58] Field of Search ................... 363/34, 37, 39, 363/40, 41, 65, 71

[56] References Cited

U.S. PATENT DOCUMENTS

| | | | |
|---|---|---|---|
| 3,648,149 | 3/1972 | Brown et al. | 363/43 |
| 5,805,437 | 9/1998 | Gruning | 363/71 |

FOREIGN PATENT DOCUMENTS 196 15 855   4/1996   Germany .

*Primary Examiner*—Jeffrey Sterrett
*Attorney, Agent, or Firm*—Burns, Doane, Swecker & Mathis, L.L.P.

[57] ABSTRACT

A method for operating a power electronic circuit having a first power convertor and at least one second power convertor is specified. The pulse duration-modulated driving of the switches of the circuit arrangement is effected according to a comparison of a reference oscillation with a carrier oscillation. According to the invention, a component of a third harmonic is admixed with the reference oscillation over virtually the entire drive-level range, in particular including low drive-level rates in the range from 20% to approximately 87%. It is also possible to admix a corresponding component of a ninth harmonic in the drive-level range from 20% to approximately 33%. This results in a low clock frequency for the first power convertor and the second power convertor need not have a feedback capability. (FIG. 1)

19 Claims, 5 Drawing Sheets

OPERATING A POWER ELECTRONIC CIRCUIT ARRANGEMENT HAVING MULTIPLE POWER CONVERTERS

BACKGROUND OF THE INVENTION

1. Field of the Invention

The invention is concerned with the field of power electronics. It is based on a method for operating a power electronic circuit arrangement according to the preamble of claim 1.

2. Discussion of Background

Such a method is disclosed in German Patent Application 196 15 855.9, which is not a prior publication. What is involved in that case is a power electronic circuit arrangement in which an improved approximation of the sinusoidal output voltage is intended to be achieved by providing at least two series-connected power converters which are driven in such a way that the intermediate circuit voltages of the power converters can be combined as desired.

If the intermediate circuit voltage of the first power converter is chosen to be greater than that of the second power converter, then the second power converters constitute so-called fine stages whose output voltage can be added to or subtracted from that of the first power converter. The switches of the power converters are driven by a pulse duration-modulated pulse train, which is generated for example by comparison of a reference oscillation with a carrier oscillation. In the event of a maximum drive level, that is to say maximum output voltage and maximum frequency, the majority of the output voltage is intended to be formed by the slowly pulsed first power converter. The latter is preferably also furnished with powerful GTOs, while the second power converter may be equipped e.g. with IGETs. The switching frequency of the first power converter should be as low as possible in order that the switching losses do not become too large. In the event of a low drive level, that is to say low frequency and low output voltage, it may thereby happen, however, that the power of the second power converter becomes negative, that is to say that said converter outputs power. This corresponds to energy feedback from the second power converter. However, this is undesirable; the circuit arrangement becomes less expensive when it does not have to be capable of taking up energy that has been fed back.

SUMMARY OF THE INVENTION

Accordingly, one object of the invention is to provide a novel method for operating a power electronic circuit arrangement which makes it possible to achieve not only the lowest possible switching frequency of the first power converter but also no energy feedback from the second power converter. This object is achieved by means of the features of the first claim.

The heart of the invention, then, is that a component of a third harmonic is admixed with the reference oscillation, which is required for generating the pulse duration-modulated control sequences for the switches, over virtually the entire drive-level range, in particular including low drive-level rates in the range from 20% to approximately 87%. In this case, it is permitted for the amplitude of the admixed third harmonic to be chosen only such that the sum of the fundamental and the third harmonic does not exceed a predetermined maximum value of the reference oscillation. The following relationships preferably apply to the dependence of the component of the third harmonic according to the drive level:

$\hat{a}_1$: Amplitude of the component at the frequency $f_1$ of the reference voltage and thus also of the output voltage of the power electronic circuit arrangement $\hat{a}_3$: Amplitude of the component of the reference voltage and thus also of the output voltage of the power electronic circuit arrangement at the frequency $3 \cdot f_1$ According to the invention, the $\hat{a}_3$ component is always to be controlled in such a way that the maximum amplitude $(A_{max})$ of the reference voltage is always achieved. The following thus applies derived from the reference voltage for $\omega t = \pi/2$:

$$\hat{a}_1 - \hat{a}_3 = A_{max} = 1 \text{ p.u.} \quad (1)$$

A 3rd harmonic having an amplitude of $\hat{a}_{3N}$, for example equal to 13%, is typically admixed at the nominal frequency in order to increase the drive level of the power converters. The following applies in this operating case for $\omega t = \pi/2$:

$$\hat{a}_1 - \hat{a}_{3N} = A_{max} = 1 \text{ p.u.} \quad (2)$$

The term "p.u." represents "per unit" notation, which is well known in the art and which indicates that physical values are represented relative to a normalizing value, for example a nominal operating value. Thus, the maximum amplitude or operating value $(A_{max})$ of the reference voltage is defined as being the normalizing value for the reference voltage.

The following relationship thus applies as a function of $f_1$:

$$\hat{a}_1 = (A_{max} + \hat{a}_{3N}) \cdot f_1 \quad (3)$$

under the precondition that a frequency-proportional drive level is intended to be achieved.

The following thus results from (1) and (3)

$$\hat{a}_3 = A_{max} + (A_{max} + \hat{a}_{3N}) \cdot f_1$$

| For example: | $A_{max}$ = 1 and | $\hat{a}_{3N}$ = 0.13 |
|---|---|---|
| | $f_1$ = 1: | $\hat{a}_3$ = 0.13 |
| | $f_1$ = 0.87: | $\hat{a}_3$ = 0 |
| | $f_1$ = 0.8. | $\hat{a}_3$ = −0.096 |
| | $f_1$ = 0.5: | $\hat{a}_3$ = −0.435 |
| | $f_1$ = 0.2: | $\hat{a}_3$ = −0.774 |

The first and second power converters can optionally be constructed after the manner of a three-point invertor or of a two-point invertor.

Analogous results regarding the power division can also be achieved with the 9th, the 27th, etc. harmonic. The modulation with these harmonics represents an advantageous alternative primarily in the lower rotational speed range.

Although the method according to the invention means that the star point of a connected machine oscillates at the third harmonic, the major advantage is afforded by the fact that in conjunction with the lowest possible switching frequency of the first power convertor and low switching losses governed thereby, the power of the second power converter never becomes negative. This enables a simpler and more cost-effective design of the circuit arrangement and also an increased efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
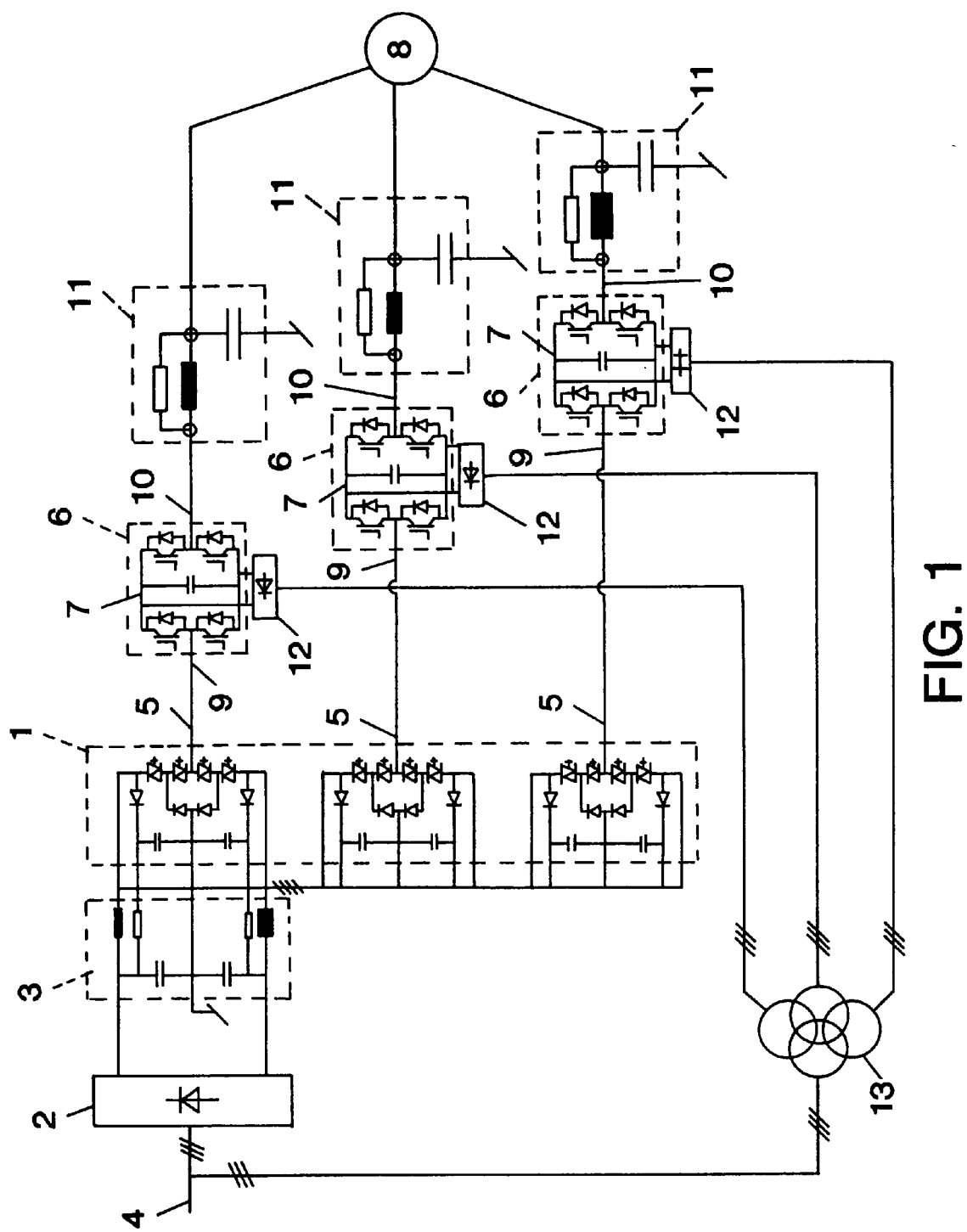
FIG. 1 shows an equivalent circuit diagram of a circuit arrangement for which the method according to the invention is suitable.

The reference numerals used in the drawings and their meanings are summarized in the List of Designations.

DESCRIPTION OF THE PREFERRED EMBODIMENTS

Referring now to the drawings, wherein like reference numerals designate identical or corresponding parts throughout the several views, FIG. 1 shows a circuit diagram of a circuit arrangement for which the method according to the invention is suitable. 1 designates a first power convertor, which is connected to a power supply system 4 via a first rectifier 2 and a first DC voltage intermediate circuit 3. The first DC voltage intermediate circuit has a voltage Uzk1. The power convertor 1 is designed as a three-phase three-point invertor in the exemplary embodiment illustrated. A two-point invertor topology would alternatively be possible. The phases are connected to the first DC voltage intermediate circuit 3, which is fed by the power supply system 4 via the first rectifier 2. Second power convertors 6 are connected to the load terminals 5 of the first power convertor. In the exemplary embodiment according to FIG. 1, the second power convertors comprise two bridge arms having a first and a second bridge terminal 9 and 10. The first bridge terminal 9 is connected to the respective load terminal 5 of the first power convertor, while the second bridge terminal 10 is connected, via a filter 11 that is interposed should the need arise, to the terminals of a load 8, for example of a three-phase motor. A second DC voltage intermediate circuit 7 having a voltage Uzk2 is provided between the bridge arms of the second power convertors 6. This second DC voltage intermediate circuit is formed by a capacitor fed by a second rectifier 12. The rectifiers 12 may be fed by the power supply system 4 via a transformer 13, for example. The second power convertors 6 could alternatively be constructed after the manner of a three-point invertor.

The circuit functions as follows: By driving the semiconductor switches of the first power convertor 1, either the positive or the negative intermediate circuit voltage Uzk1 or 0 volts can be connected to the load terminals 5. The positive or negative intermediate circuit voltage Uzk2 or 0 volts can then be added to the former voltage by corresponding driving of the semiconductor switches of the second power convertors 6. The driving methods and the functioning of the semiconductor switches are assumed to be known and are not explained any further at this point. The pulse duration-modulated switching commands of the switches can be effected for example by comparison of an essentially sinusoidal reference oscillation with a triangular carrier oscillation. If the reference oscillation has the maximum permitted frequency and the maximum permitted amplitude, then one speaks of a maximum drive level. The drive level decreases proportionally to the frequency.

Preferably, the first power convertor 1 is furnished with powerful GTOs, while the second power convertor 6 is equipped with IGBTs. The first intermediate circuit 3 may be rated at 2.7 kV, for example, and the second at 900 V. In this case, the circuit arrangement can produce an AC voltage which varies between 0 V and ±3.6 kV. Other values can also be achieved by corresponding rating of the intermediate circuits or design of the topology of the power convertors.

On account of the use of GTOs and the higher voltage, the switching losses in the first power convertor 1 are greater than in the second power convertors 6. Therefore, it would be desirable if the first power convertor 1 could be pulsed as slowly as possible over the entire drive-level range, in particular including a low drive level. One possibility would be to use the second power convertor 6 for reducing the output voltage, that is to say to subtract the second intermediate circuit voltage Uzk2 from the first Uzk1 or from 0 volts. Energy feedback from the second power convertor 6 into the power supply system 4 then occurs, however, and the second power convertor would have to be designed with a feedback capability. Therefore, it would additionally be desirable if the second power convertor 6 did not have to feed any energy back.

This problem is now solved according to the invention by virtue of the fact that a component of a third harmonic of the fundamental is admixed with the reference oscillation over virtually the entire drive-level range, in particular including a low drive level in the range from approximately 20% to approximately 87%, that is to say between 12 Hz and approximately 54 Hz in the case of a 60 Hz arrangement. The amplitude of the third harmonic is chosen such that the sum of the fundamental and the third harmonic never exceeds the maximum permitted value of the reference oscillation.

Figure 2:
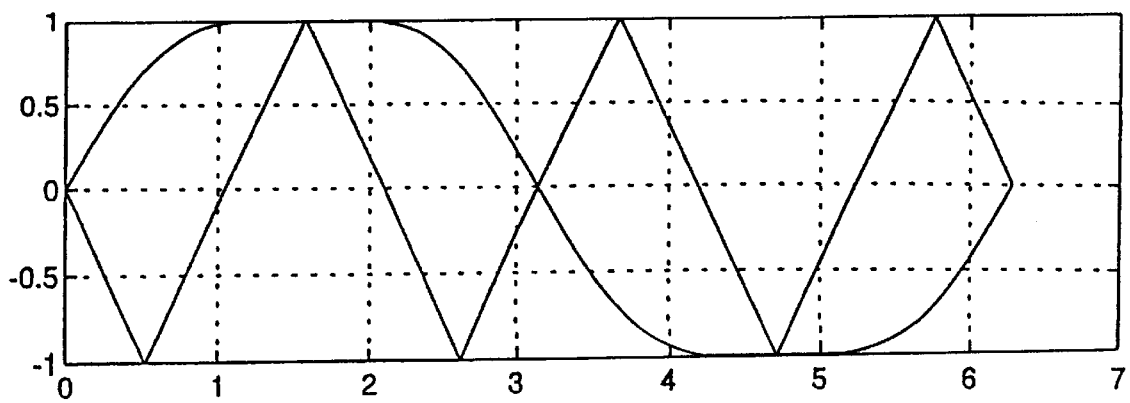
FIGS. 2–10 show various voltage profiles which can be produced by the method according to the invention.
Figure 3:
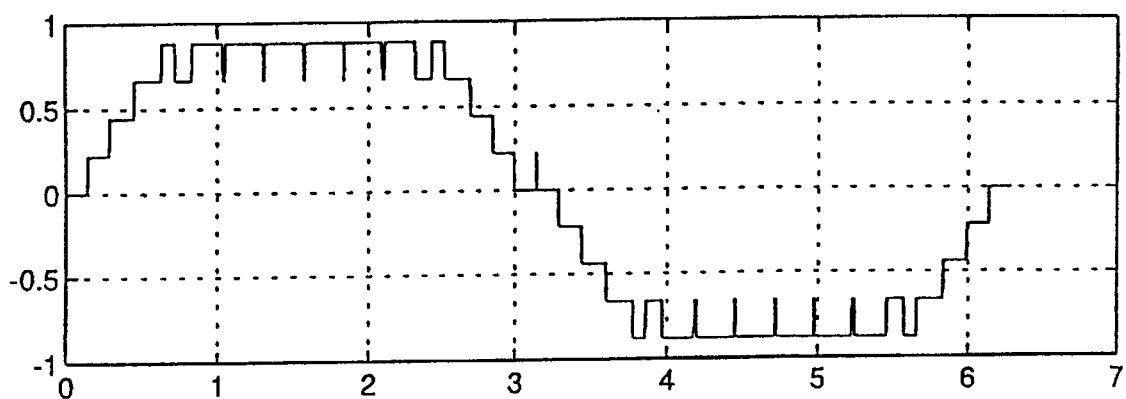
Figure 4:
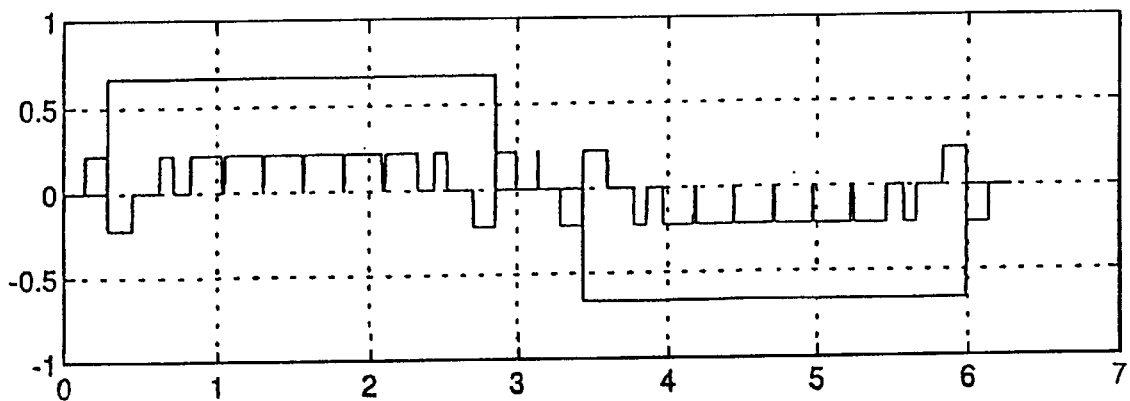

FIG. 2 shows the normalized reference oscillation and the carrier oscillation in the event of a maximum drive level (e.g. 60 Hz). The component of the third harmonic is 0.13. The third harmonic must therefore be subtracted in the region at $\omega t=\pi/2$ in order not to violate the above specification ($\sin\omega_1 t + 0.13$ are $(3\omega_1 t)$). The reference voltage is flattened somewhat as a result. FIG. 3 shows a phase voltage and FIG. 4 the switching commands of the switches. The switching commands for the power convertor 1 are shown to pulse slowly and the switching commands of the power convertor 6 are shown to pulse 12 times faster.

Figure 5:
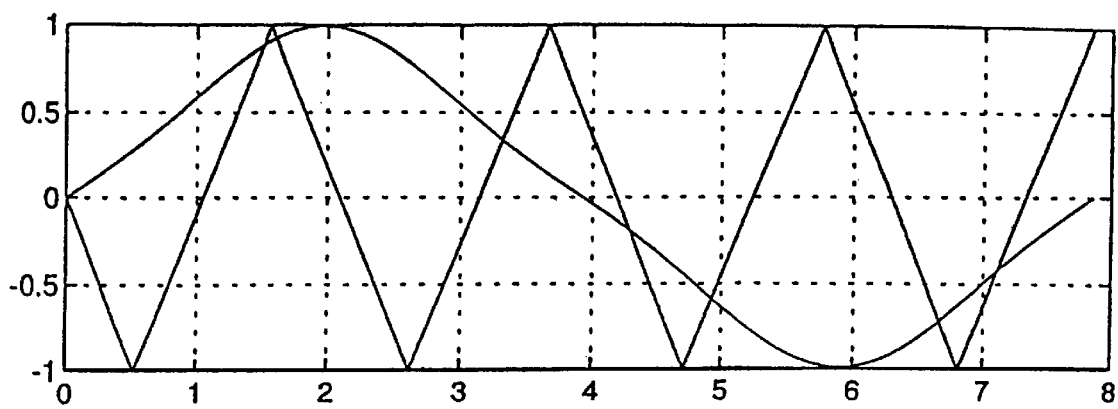
Figure 6:
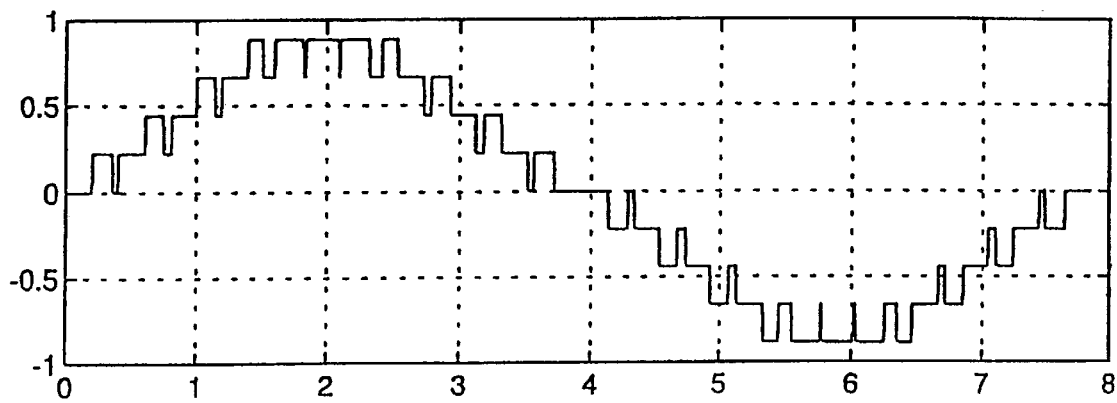
Figure 7:
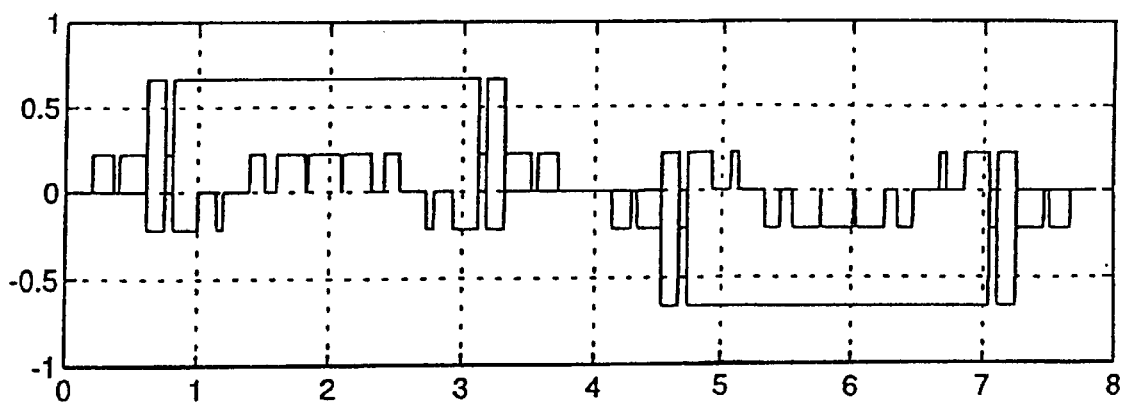

FIGS. 5 to 7 show the corresponding voltage profiles in the event of an 80% drive level (that is to say e.g. 48 Hz). In this case, the component of the third harmonic is -0.096; the third harmonic is thus added at $\omega t=\pi/2$.

Figure 8:
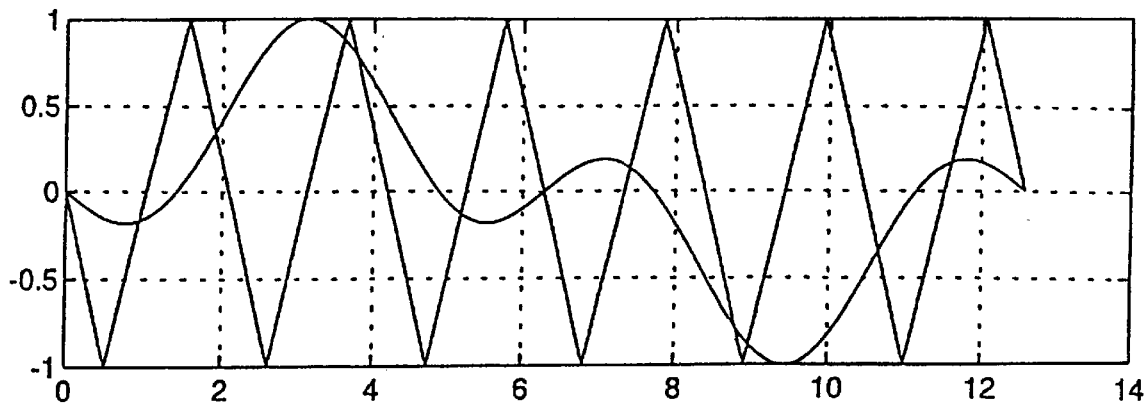
Figure 9:
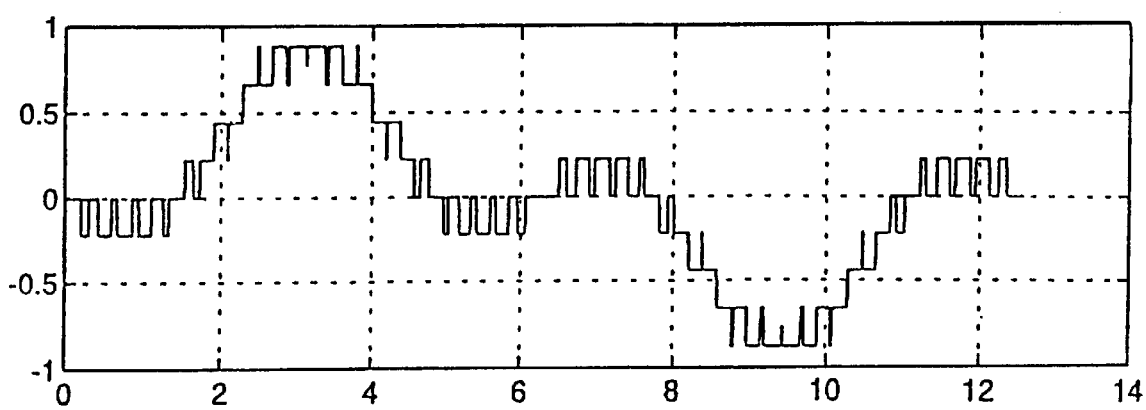
Figure 10:
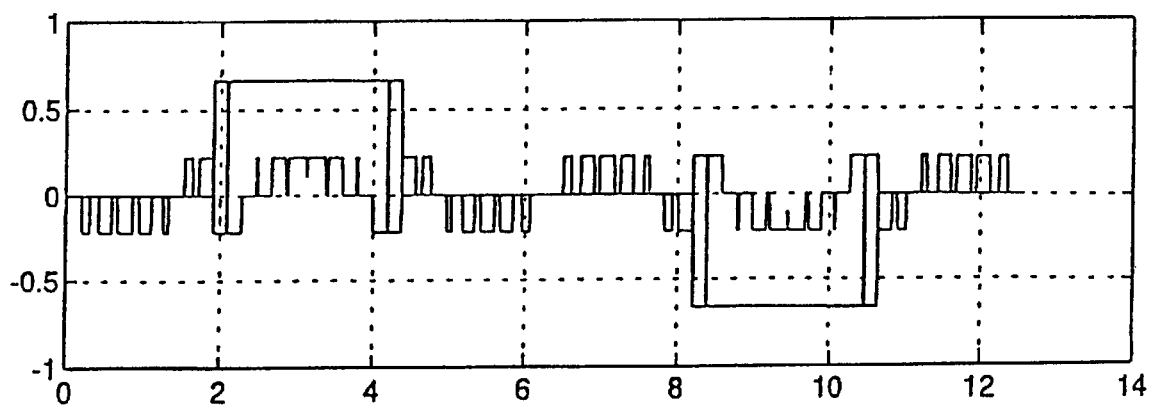
Figure 11:
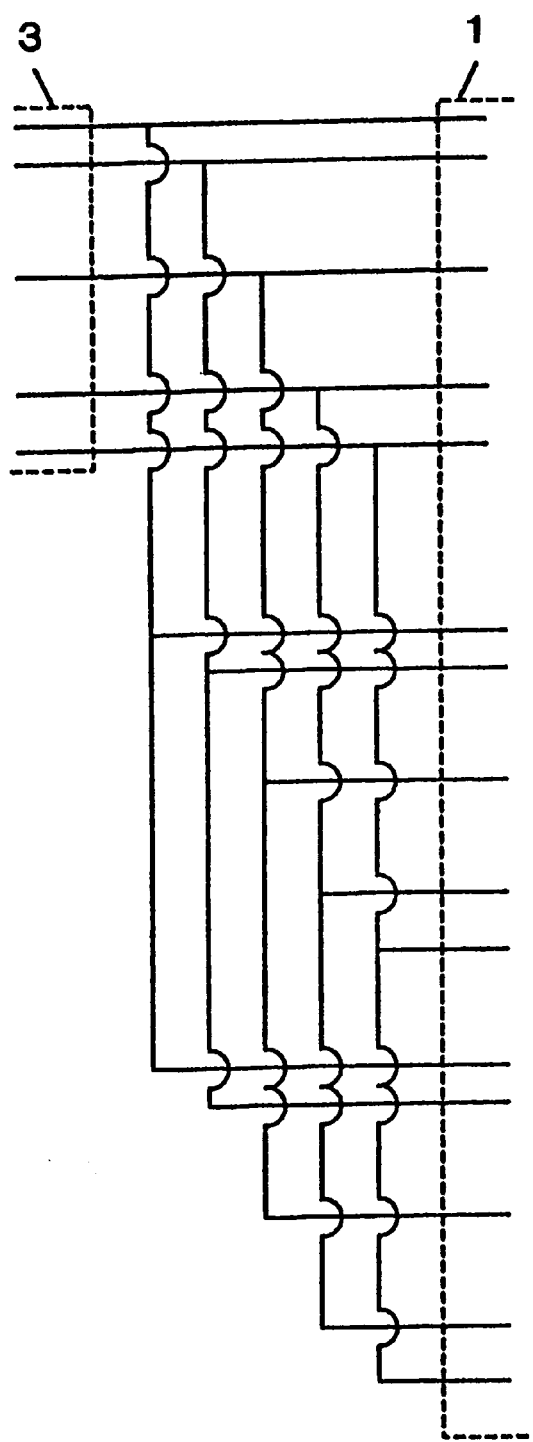
FIG. 11 is a magnified view of the connections between the power converter 1 and the DC voltage intermediate circuit 3 of FIG. 1.

Finally, FIGS. 8 to 10 show the same voltage profiles in the event of a drive level of 50% (that is to say e.g. 30 Hz). In this case, the component of the third harmonic is already -0.435.

Starting from a drive level of less than 20%, the first power convertor 1 is no longer driven at all and the entire load is connected to the second power convertor 6.

The admixing of a component of the third harmonic in the manner according to the invention means that the star point of the connected motor 8 oscillates at the frequency of the third harmonic. However, this does not interfere with operation of the motor 8.

The component of the third harmonic as a function of the drive level can be specified as follows:

$â_3 = -A_{max} + (A_{max} + â_{3N}) \cdot f_1$ $A_{max} = 1$ p.u.

In the event of a low drive level, it is also possible to admix a component of a ninth harmonic instead of the third harmonic. A reduction in the power pulsation in the intermediate circuit of the second power convertor is achieved for example by admixing a ninth harmonic having an amplitude $â_9$ according to the following relationship:

$\hat{a}_9 = -A_{max} + (A_{max} + \hat{a}_{3N}) \cdot f_1$ is admixed instead of the third harmonic starting from a drive level of approximately 33%.

The method according to the invention enabled a maximum clock frequency of the first power convertor 1 of 300 Hz to be achieved for a maximum drive level of the circuit arrangement at 60 Hz over the entire drive-level range. It was possible to avoid energy feedback from the second power convertors 6, and the efficiency of the entire system was in the region of 99%. The switching losses could thus be kept extremely low.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power electronic circuit arrangement comprising:
    a first power convertor which is connected to a power supply system via a first DC voltage intermediate circuit having a first intermediate circuit voltage and a first rectifier and which has one load terminal per phase;
    at least one second power convertor having a second DC voltage intermediate circuit having a second intermediate circuit voltage, which second power convertor is connected to the load terminal of the first power convertor;
    the first and second power convertors having switches which are driven with pulse duration modulation according to a comparison of an essentially sinusoidal reference oscillation with at least one carrier oscillation, in such a way that the second intermediate circuit voltage can be added to or subtracted from the first intermediate circuit voltage and a mapping of the reference oscillation is produced at the output of the power electronic circuit; wherein
    a component of a third harmonic is admixed with the reference oscillation over virtually the entire drive-level range of the power electronic circuit arrangement, in particular including a drive level of more than approximately 20% and less than approximately 87%.

2. The power electronic circuit arrangement as claimed in claim 1, wherein the amplitude of the admixed third harmonic is chosen such that a sum of the fundamental and the third harmonic never exceeds a maximum permitted value of the reference oscillation.

3. The power electronic circuit arrangement as claimed in claim 2, wherein the amplitude $\hat{a}_3$ of the third harmonic is chosen according to the drive level as follows:
    $\hat{a}_3 = -A_{max} + (A_{max} + \hat{a}_{3N}) \cdot f_1$, wherein
    $A_{max} = 1$ p.u. (maximum permitted value of the reference voltage)
    $\hat{a}_{3N}$ = component of the 3rd harmonic which is admixed at $f_1 = f_{1N}$ (nominal frequency) = 1 p.u.

4. The power electronic circuit arrangement as claimed in claim 2, wherein a ninth harmonic having an amplitude $\hat{a}_9$ according to the following relationship:
    $\hat{a}_9 = -A_{max} + (A_{max} + \hat{a}_{3N}) \cdot f_1$, wherein p1 $A_{max} = 1$ p.u. (maximum permitted value of the reference voltage) and
    $\hat{a}_{3N}$ = component of the $3^{rd}$ harmonic which is admixed at $f_1 = f_{1N}$ (nominal frequency) = 1 p.u.
is admixed instead of the third harmonic starting from a drive level of approximately 33%.

5. The power electronic circuit arrangement as claimed in claim 1, wherein the first power convertor is constructed after the manner of a two-point invertor and the second power convertor is constructed after the manner of a two- or three-point invertor.

6. The power electronic circuit arrangement as claimed in claim 1, wherein the first power convertor is constructed after the manner of a three-point invertor and the second power convertor is constructed after the manner of a two- or three-point invertor.

7. A method for operating a power electronic circuit arrangement, the power electronic circuit arrangement comprising:
    a first power convertor having switches and one load terminal per phase, the first power convertor being connected to a power supply system via a first rectifier and a first DC voltage intermediate circuit having a first intermediate circuit voltage;
    at least one second power convertor having switches and a second DC voltage intermediate circuit that has a second intermediate circuit voltage, the at least one second power convertor being connected to the load terminal of the first power convertor; and
    the method comprising the steps of:
    driving the switches of the first and second power convertors with pulse duration modulation based on a comparison of an essentially sinusoidal reference oscillation with at least one carrier oscillation, in such a way that the second intermediate circuit voltage can be added to or subtracted from the first intermediate circuit voltage and a mapping of the reference oscillation is produced at the output of the power electronic circuit; and
    admixing a component of a third harmonic with the reference oscillation over virtually an entire drive-level range of the power electronic circuit arrangement.

8. The method of claim 7, wherein:
    the first power convertor is a polyphase power convertor; and
    the range of the power electronic circuit arrangement over which the component of the third harmonic is admixed with the reference oscillation includes a drive level of more than approximately 20% and less than approximately 87%.

9. The method of claim 7, further comprising the step of choosing an amplitude of the third harmonic such that a sum of the fundamental and the third harmonic never exceeds a maximum permitted value of the reference oscillation.

10. The method of claim 9, wherein the amplitude $\hat{a}_3$ of the third harmonic is chosen according to the drive level as follows:
    $\hat{a}_3 = -A_{max} + (A_{max} + \hat{a}_{3N}) \cdot f_1$, wherein
    $A_{max} = 1$ p.u. (maximum permitted value of the reference voltage)
    $\hat{a}_{3N}$ = component of the $3^{rd}$ harmonic which is admixed at $f_1 = f_{1N}$ (nominal frequency) = 1 p.u.

11. The method of claim 9, further comprising the step of admixing a ninth harmonic instead of the third harmonic starting from a drive level of approximately 33%, where the ninth harmonic has an amplitude $\hat{a}_9$ according to the relationship:
    $\hat{a}_9 = -A_{max} + (A_{max} + \hat{a}_{3N}) \cdot f_1$, wherein
    $A_{max} = 1$ p.u. (maximum permitted value of the reference voltage) and
    $\hat{a}_{3N}$ = component of the $3^{rd}$ harmonic which is admixed at $f_1 = f_{1N}$ (nominal frequency) = 1 p.u.

12. The method of claim 7, wherein the first power convertor is constructed after the manner of a two-point invertor and the second power convertor is constructed after the manner of a two- or three-point invertor.

13. The method of claim 7, wherein the first power convertor is constructed after the manner of a three-point invertor and the second power convertor is constructed after the manner of a two- or three-point invertor.

14. A method for operating a power electronic circuit arrangement, comprising the steps of:

driving switches of first and second power convertors in the power electronic circuit arrangement with pulse duration modulation based on a comparison of an essentially sinusoidal reference oscillation with at least one carrier oscillation, to a) allow a second intermediate voltage input to the second power convertor to be added to or subtracted from a first intermediate voltage input to the first power convertor and b) produce a mapping of the reference oscillation at an output of the power electronic circuit; and admixing a component of a harmonic with the reference oscillation over virtually an entire drive-level range of the power electronic circuit arrangement.

15. The method of claim 14, wherein the harmonic is a third harmonic.

16. The method of claim 15, wherein:

the first power convertor is a polyphase power convertor; and the range of the power electronic circuit arrangement over which the component of the third harmonic is admixed with the reference oscillation includes a drive level of more than approximately 20% and less than approximately 87%.

17. The method of claim 15, further comprising the step of choosing an amplitude of the third harmonic such that a sum of the fundamental and the harmonic never exceeds a maximum permitted value of the reference oscillation.

18. The method of claim 15, wherein the amplitude $â_3$ of the third harmonic is chosen according to the drive level as follows:

$â_3 = -A_{max} + (A_{max} + â_{3N}) \cdot f_1$, wherein $A_{max}$=1 p.u. (maximum permitted value of the reference voltage)

$â_{3N}$=component of the $3^{rd}$ harmonic which is admixed at $f_1 = f_{1N}$(nominal frequency)=1 p.u.

19. The method of claim 14, further comprising the step of admixing the harmonic starting from a drive level of approximately 33%, wherein the harmonic is a ninth harmonic having an amplitude $â_9$ according to the relationship:

$â_9 = -A_{max} + (A_{max} + â_{3N}) \cdot f_1$, wherein $A_{max}$=1 p.u. (maximum permitted value of the reference voltage) and $â_{3N}$=component of the $3^{rd}$ harmonic which is admixed at $f_1 = f_{1N}$(nominal frequency)=1 p.u.

* * * * *